(12) United States Patent
Kishimoto et al.

(10) Patent No.: US 8,998,706 B2
(45) Date of Patent: Apr. 7, 2015

(54) GAME SYSTEM FOR EXCHANGING MEDIUM IN GAME

(71) Applicant: DeNA Co., Ltd., Tokyo (JP)

(72) Inventors: Yuji Kishimoto, Tokyo (JP); Eishi Kuroda, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 73 days.

(21) Appl. No.: 13/851,910

(22) Filed: Mar. 27, 2013

(65) Prior Publication Data

US 2013/0303266 A1   Nov. 14, 2013

(30) Foreign Application Priority Data

May 10, 2012   (JP) .................. 2012-108935

(51) Int. Cl.
*G06F 17/00* (2006.01)
*A63F 13/00* (2014.01)
(Continued)

(52) U.S. Cl.
CPC ............... *A63F 13/00* (2013.01); *A63F 13/12* (2013.01); *A63F 2300/575* (2013.01); *A63F 13/75* (2014.09)

(58) Field of Classification Search
CPC .................................... A63F 13/00
USPC .................................... 463/16–25
See application file for complete search history.

(56) References Cited

U.S. PATENT DOCUMENTS

| | | | |
|---|---|---|---|
| 8,777,756 B2 * | 7/2014 | Kishimoto et al. | 463/42 |
| 2004/0242294 A1 * | 12/2004 | Shiozawa | 463/9 |
| 2013/0281214 A1 * | 10/2013 | Kishimoto et al. | 463/40 |

FOREIGN PATENT DOCUMENTS

| | | |
|---|---|---|
| JP | 2002-315970 | 10/2002 |
| JP | 2003-023661 | 1/2003 |

(Continued)

OTHER PUBLICATIONS

Isao Moriyasu, "Certificate for Application of Provision of Exception to Lack of Novelty on Invention" with English translation of Abstract, Publication http://sp.mbga.jp/gcard/info/info__120402__trader-rulechange.html (Apr. 2, 2012), May 21, 2012, 7 pages.
Japanese Office Action mailed on Apr. 15, 2014 in connection with Japanese Patent Application No. 2012-108935 and English translation.
Guidebook of Kaito and Sengoku Royale, Tetsujinsya, Inc., Sep. 15, 2010, p. 009.

(Continued)

*Primary Examiner* — Ronald Laneau
(74) *Attorney, Agent, or Firm* — Pillsbury Winthrop Shaw Pittman LLP

(57) ABSTRACT

One object is to provide a system that determines a fairer exchange rate than conventional systems, the determined exchange rate being used in exchange of game contents in virtual space such as games. In accordance with one aspect, a game system according to an embodiment of the present invention includes a trade condition updating unit 59 configured to update first trade condition information so as to include the trade quantity and the player identification information of a third player included in a first trade condition updating request obtained from the third player when the first trade condition updating request includes a trade quantity of a first game content and the trade quantity of the first game content is greater than the trade quantity included in the first trade condition information, and configured to update second trade condition information so as to include the trade quantity and the player identification information of the third player included in the first trade condition updating request when the first trade condition updating request includes a trade quantity of a second game content and the trade quantity of the second game content is greater than the trade quantity included in the second trade condition information.

7 Claims, 14 Drawing Sheets

(51) Int. Cl.
*A63F 13/30* (2014.01)
*A63F 13/75* (2014.01)

(56) References Cited

FOREIGN PATENT DOCUMENTS

| | | |
|---|---|---|
| JP | 2005-028103 | 2/2005 |
| JP | 2009-187143 (A) | 8/2009 |

OTHER PUBLICATIONS

Official Guidebook of Tengaimakyou III Namida, Enterbrain, Apr. 26, 2005, First Edition, p. 24 (see particularly the column "Barter.").
Guidebook of Unlimited SAGA for Biginners, DigiCube Co., Ltd., Dec. 19, 2002, First Edition, p. 20.
Playing Manual 2005 of Final Fantasy XI, Phantom of Jirat, Square Enix, Ltd., Accepted by JPO on Mar. 31, 2005, pp. 057-058.

* cited by examiner

| Player Identification Information | Player Name | Avatar | ... |
|---|---|---|---|
| 000001 | chapin | http://aaaaaaa/aaa.jpg | ... |
| 000002 | Yuki | http://bbbbbb/bbb.jpg | ... |
| 000003 | Azusa | http://ccccccc/ccc.jpg | ... |
| 000004 | Riku | http://dddddd/ddd.jpg | ... |
| 000005 | Akiko | http://eeeeee/eee.jpg | ... |
| ... | ... | ... | ... |

| Player Identification Information | Owned Quantity of Item A | Owned Quantity of Item B | Owned Quantity of Item C | ... |
|---|---|---|---|---|
| 000001 | 74 | 0 | 18 | ... |
| 000002 | 12 | 2 | 14 | ... |
| 000003 | 89 | 0 | 13 | ... |
| 000004 | 31 | 1 | 5 | ... |
| 000005 | 9 | 0 | 0 | ... |
| ... | ... | ... | ... | ... |

Fig. 5

| Trade ID | Type Code of Game content 1 | Trade Quantity of Game content 1 | Player Identification Information 1 | Type Code of Game content 2 | Trade Quantity of Game content 2 | Player Identification Information 2 | Trade Termination Time |
|---|---|---|---|---|---|---|---|
| A000001 | aaaa | 50 | 000001 | bbbb | 1 | 000002 | April 9 8:51 |
| A000002 | aaaa | 70 | 000004 | bbbb | 1 | 020931 | April 9 9:25 |
| A000003 | bbbb | 1 | 000005 | dddd | 1 | 000004 | April 9 9:31 |
| A000004 | bbbb | 2 | 002987 | N/A | N/A | N/A | April 9 10:04 |
| A000005 | aaaa | 40 | 038349 | ffff | 10 | N/A | April 9 10:12 |
| ... | ... | ... | ... | ... | ... | ... | ... |

Fig. 6

| Trade ID | Type Code of Game content 1 | Trade Quantity of Game content 1 | Player Identification Information 1 | Type Code of Game content 2 | Trade Quantity of Game content 2 | Player Identification Information 2 | Trade Termination Time |
|---|---|---|---|---|---|---|---|
| A000001 | aaaa | 60 | 000003 | bbbb | 1 | 000002 | April 9 9:51 |
| A000002 | aaaa | 70 | 000004 | bbbb | 1 | 020931 | April 9 9:25 |
| A000003 | bbbb | 1 | 000005 | dddd | 1 | 000004 | April 9 9:31 |
| A000004 | bbbb | 2 | 002987 | N/A | N/A | N/A | April 9 10:04 |
| A000005 | aaaa | 40 | 038349 | ffff | 10 | N/A | April 9 10:12 |
| ... | ... | ... | ... | ... | ... | ... | ... |

Fig. 7

| Player Identification Information | Owned Quantity of Item A | Owned Quantity of Item B | Owned Quantity of Item C | ... |
|---|---|---|---|---|
| 000001 | 74 | 0 | 18 | ... |
| 000002 | 72 | 1 | 14 | ... |
| 000003 | 29 | 1 | 13 | ... |
| 000004 | 31 | 1 | 5 | ... |
| 000005 | 9 | 0 | 0 | ... |
| ... | ... | ... | ... | ... |

Fig. 8

GAME SYSTEM FOR EXCHANGING MEDIUM IN GAME

CROSS-REFERENCE TO RELATED APPLICATIONS

This application is based on and claims the benefit of priority from Japanese Patent Application Serial No. 2012-108935 (filed on May 10, 2012), the contents of which are hereby incorporated by reference in their entirety.

TECHNICAL FIELD

The present invention relates to a game system for exchanging game contents in video games.

BACKGROUND

Online games have become popular, wherein a plurality of terminal devices connected to a server device via a communication network progress the video games using game data provided from the server device. Game contents used in online games, such as cards and items, may be traded in video games with virtual currency. For example, Japanese Patent Application Publication No. 2009-187143 (the "'143 Publication") discloses a trading system for performing, in virtual space, trades of items used in online games. In the trading system of the '143 Publication, items can be purchased with virtual currency, and the conditions of purchase are determined through an auction.

In some online games, game contents can be not only traded but exchanged between players. An exchange of game contents can be concluded when one player offers to another player the exchange of game contents with a certain condition and the other player accepts the offer.

SUMMARY

In such a system where a partner and conditions of exchange are determined through offer and acceptance, the concerned parties can desirably determine the exchange conditions resulting in distorting the exchange rate and inhibiting from forming fair exchange rate that can be otherwise determined. An auction is a system that determines trade conditions (such as a price) for (one kind of) specific product or game content to be traded between a seller and a purchaser; therefore, a conventional auction cannot be used to determine exchange conditions of game contents.

Thus, the present invention provides, through various embodiments, a system that may determine a fairer exchange rate than conventional systems. The determined exchange rate may be used in exchange of game contents in virtual space such as games.

A system according to an embodiment of the present invention comprises: a game program storage unit configured to store a game program for performing a game; an owned quantity storage unit configured to store owned quantities of first game content and second game content owned by each of a plurality of players of the game, in association with player identification information unique to each of the plurality of players; a trade condition information storage unit configured to store: first trade condition information including a trade quantity of the first game content set by a first player among the plurality of players, and player identification information of the first player; and second trade condition information including a trade quantity of the second game content set by a second player among the plurality of players, and player identification information of the second player, in association with each other; a trade rate information generating unit configured to generate trade rate information including the trade quantity of the first game content and the trade quantity of the second game content stored on the trade condition information storage unit a trade rate information presenting unit configured to present the trade rate information in the game being played by a third player among the plurality of players; a trade condition updating request receiving unit configured to receive a first trade condition updating request including at least one of a trade quantity of the first game content and a trade quantity of the second game content set by the third player; a trade condition updating unit configured to update the first trade condition information so as to include the trade quantity and the player identification information of the third player included in the first trade condition updating request when the first trade condition updating request includes the trade quantity of the first game content and the trade quantity of the first game content is greater than the trade quantity included in the first trade condition information, and configured to update the second trade condition information so as to include the trade quantity and the player identification information of the third player included in the first trade condition updating request when the first trade condition updating request includes the trade quantity of the second game content and the trade quantity of the second game content is greater than the trade quantity included in the second trade condition information; and an owned quantity updating unit configured to update the owned quantities of the first game content and the second game content stored on the owned quantity storage unit, based on the first trade condition information and the second trade condition information stored on the trade condition information storage unit.

A method using a computer according to an embodiment of the present invention comprises the steps of: storing game programs for performing games; storing owned quantities of first game content and second game content owned by each of a plurality of players of the game, in association with player identification information unique to the player; storing: first trade condition information including a trade quantity of the first game content set by a first player among the plurality of players, and player identification information of the first player; and second trade condition information including a trade quantity of the second game content set by a second player among the plurality of players, and player identification information of the second player, in association with each other; generating trade rate information including the trade quantity of the first game content and the trade quantity of the second game content stored on the trade condition information storage unit presenting the trade rate information in the game being played by a third player among the plurality of players; receiving a first trade condition updating request including at least one of the trade quantity of the first game content and the trade quantity of the second game content set by the third player; updating the first trade condition information so as to include the trade quantity and the player identification information of the third player included in the first trade condition updating request when the first trade condition updating request includes the trade quantity of the first game content and the trade quantity of the first game content is greater than the trade quantity included in the first trade condition information, and updating the second trade condition information so as to include the trade quantity and the player identification information of the third player included in the first trade condition updating request when the first trade condition updating request includes the trade quantity of the second game content and the trade quantity of the second game content is greater than the trade quantity included in the second trade condition information; and updating the owned quantities of the first game content and the second game content stored on the owned quantity storage unit, based on the first trade condition information and the second trade condition information stored on the trade condition information storage unit.

Various embodiments of the present invention provide a system that determines a fairer exchange rate than conventional systems, the determined exchange rate being used in exchange of game contents in virtual space such as games.

BRIEF DESCRIPTION OF THE DRAWINGS

FIG. 5 shows an example of owned quantity management table used in a video game system according to an embodiment of the present invention.

FIG. 6 shows an example of trade condition information management table used in a game system according to an embodiment of the present invention.

FIG. 7 shows an example of trade condition information management table after updating.

FIG. 8 shows an example of owned quantity management table after updating.

DESCRIPTION OF EXAMPLE EMBODIMENTS

Figure 1:
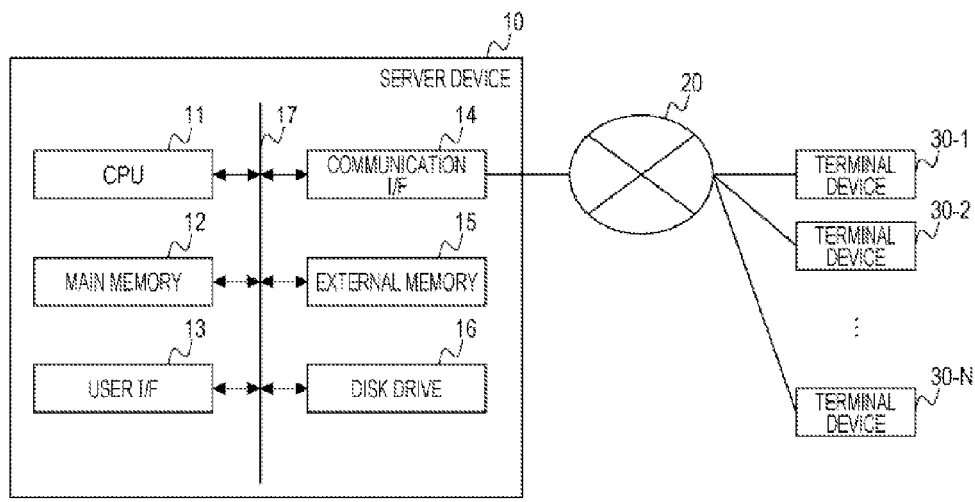
FIG. 1 is a block diagram schematically illustrating the architecture of a video game system according to an embodiment of the present invention.

Various embodiments of the present invention will be described hereinafter with reference to the drawings. In the drawings, the same components are denoted by the same reference numerals.

FIG. 1 is a block diagram schematically illustrating the architecture of a video game system according to an embodiment of the present invention. As illustrated in FIG. 1, in the embodiment of the present invention, an online game server device 10 (hereinafter also referred to simply as the "server device 10") may be communicatively connected to a plurality of terminal devices 30-1, 30-2, . . . , and 30-N (hereinafter also collectively referred to as the "terminal devices 30"), each having a communication function, via a communication network 20 such as the Internet. The server device 10 is an example of a device implementing part or all of a system according to an embodiment of the present invention.

As illustrated in FIG. 1, the server device 10 may include a central processing unit (CPU) 11, a main memory 12, a user interface (I/F) 13, a communication I/F 14, an external memory 15, and a disk drive 16, and these components may be electrically connected to one another via a bus 17. The CPU 11 may load an operating system and various programs for controlling the progress of an online game into the main memory 12 from the external memory 15, and may execute commands included in the loaded programs. The main memory 12 may be used to store a program to be executed by the CPU 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminal devices 30 via the communication network 20.

The external memory 15 may be formed of, for example, a magnetic disk drive, and store various programs such as a game program for allowing the terminal device 30 to execute an online game and a control program for controlling the progress of the online game. The game program may be created using, for example, Adobe Flash™, which is a format developed by Adobe Systems Incorporated to handle moving images, games, and the like. The game program created using Adobe Flash™ may be stored in the external memory 15 as a small web format (SWF) file. The game program will be described later. The disk drive 16 may read data stored in a storage medium such as a compact disc read only memory (CD-ROM), digital versatile disc read only memory (DVD-ROM), or DVD Recordable (DVD-R) disc, or write data to such a storage medium. For example, data of a game program or the like stored in a storage medium may be read by the disk drive 16, and may be installed into the external memory 15.

The terminal device 30 may be any information processing device capable of executing and operating a game program stored on the server device 10 and displayed on a web browser, non-limiting examples of the terminal device 30 including a mobile phone, a smartphone, a game console, a personal computer, a tablet, or an electronic book reader. Additionally, the terminal device 30 may be capable of receiving a game program from the server device 10 through a communication I/F 34 (described later) for executing the game.

Figure 2:
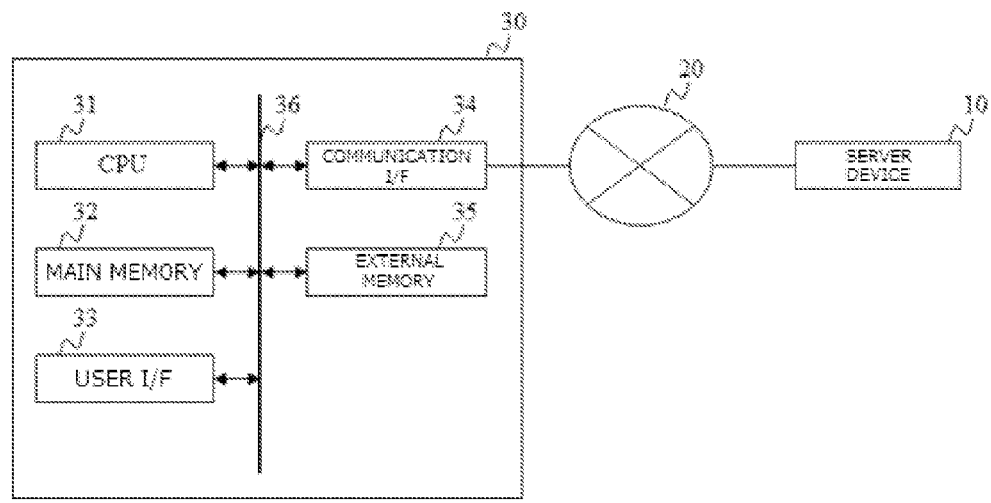
FIG. 2 is a block diagram schematically illustrating the architecture of a terminal device used in a video game system according to an embodiment of the present invention.

The architecture of these various terminal devices 30 will be described with reference to FIG. 2. FIG. 2 is a block diagram schematically illustrating the architecture of a terminal device 30 according to an embodiment of the present invention. As illustrated in FIG. 2, the terminal device 30 may include a central processing unit (CPU) 31, a main memory 32, a user interface (I/F) 33, a communication I/F 34, and an external memory 35, and these components may be electrically connected to one another via a bus 36.

The CPU 31 may load various programs such as an operating system into the main memory 32 from the external memory 35, and may execute commands included in the loaded programs. The main memory 32 may store a program to be executed by the CPU 31, and may be formed of, for example, a dynamic random access memory (DRAM).

The user I/F 33 may include, for example, an information input device such as a touch panel, a keyboard, a button, and a mouse for accepting an input from a player (user), and an information output device such as a liquid crystal display for outputting calculation results of the CPU 31. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server device 10 via the communication network 20.

The external memory 35 may comprise, for example, a magnetic disk drive or a flash memory and store various programs such as an operating system. When receiving a game program from the server device 10 via the communication I/F 34, the external memory 35 may store the received game program.

The terminal device 30 having such architecture may be provided with, for example, browser software for interpreting a hypertext markup language (HTML) file and displaying a screen, and plug-in software (e.g., Flash Player distributed by Adobe Systems Incorporated) incorporated in the browser software. The terminal device 30 may acquire an SWF file embedded in an HTML file from the server device 10, and execute the SWF file using the browser software and plug-in software, and therefore the user of the terminal device 30, or a game player, may be provided with a gaming function.

A game program will now be described with reference to FIGS. 1 and 2. The game program may be stored on the external memory 15 of the server device 10 in various forms. For example, the game program may be provided as a piece of application software executable on various application execution platforms. The player is able to execute or operate a game application using the terminal device 30.

The external memory 15 of the server device 10 may store game programs for executing or operating various games executable or operable on the terminal device 30. The game programs may be created using, for example, script languages such as ActionScript™ and JavaScript™, or object-oriented programming languages such as Objective-C™ and Java™. The game programs may be executed and/or operated on a platform installed on the terminal device 30. A game program to be stored on the external memory 15 may be produced by modifying a web page created in a markup language such as HTML5 by using a style sheet such as Cascading Style Sheet 3 (CSS3). Such a web page created in a markup language may be executed or operated by the browser software installed on the terminal device 30. The external memory 15 of the server device 10 may store a desired number of game programs, and a game program for executing and/or operating a game selected by the terminal device 30 may be provided to a desired number of terminal devices 30 via the communication I/F 14 in accordance with control of the CPU 11. In the terminal device 30, the game program sent from the server device 10 may be transferred to the external memory 35 via the communication I/F 34 in accordance with control of the CPU 31.

The user of the terminal device 30 may operate the terminal device 30 to execute the game program, so as to play various games such as action games, role-playing games, interactive baseball games, and card games. The games implemented by the game program are not limited to those explicitly disclosed herein. When a game is executed, for example, animation or an operation icon designated by the program may be displayed on a screen of the terminal device 30.

The player may enter an instruction for causing the game to progress using an input interface (e.g., a touch screen or a button) of the terminal device 30. The instruction entered by the player may be transmitted to the server device 10 through the browser of the terminal device 30 or a platform function such as NgCore™. The terminal device 30 may send information indicating various parameters (such as the number of game points earned and information concerning obtained items) used in the game, and information indicating the status of the game (such as information specifying which mission has been fulfilled) to the server device 10, if necessary. The server device 10 may manage the progress of the individual players in the game in accordance with information received from the plurality of terminal devices 30, such as instructions, information indicating the parameters, and information indicating the statuses. Thus, each player is able to resume the interrupted game from the point where it was interrupted, on the basis of the information concerning the progress of the game held in the server device 10.

Figures 3, 4:
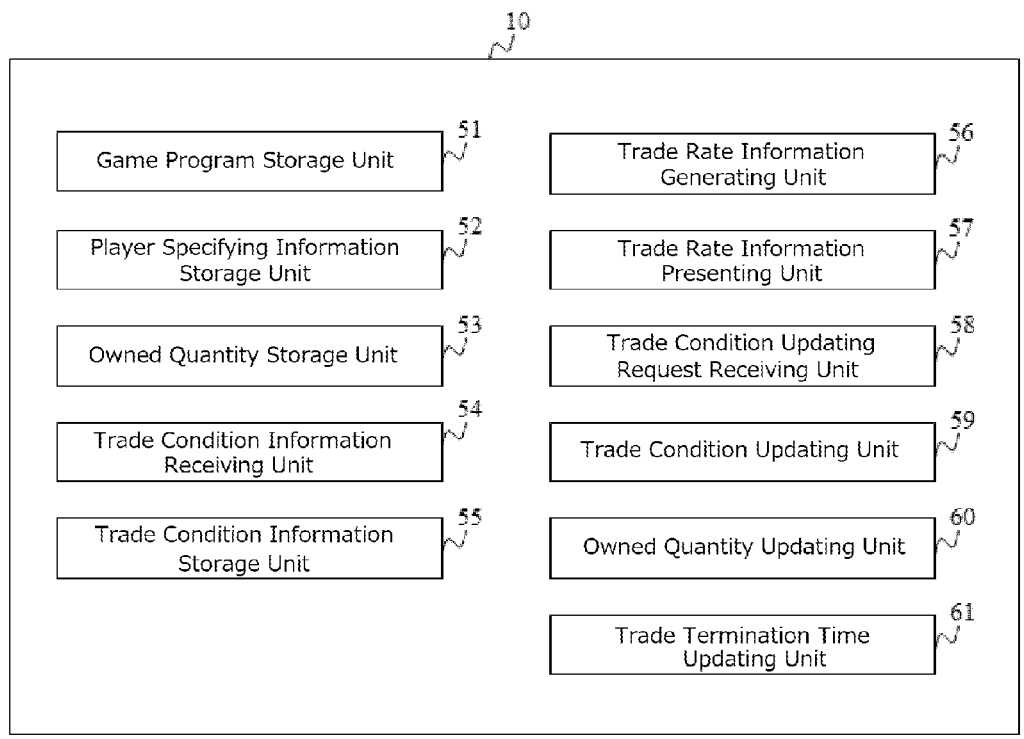
FIG. 3 is a block diagram schematically illustrating the functionality of a server device used in a video game system according to an embodiment of the present invention.
FIG. 4 shows an example of player specifying information table.

Next, the functionality of the server device 10 implemented by the components shown in FIG. 1 will be described with reference to FIG. 3. FIG. 3 is a block diagram illustrating the functionality of a server device 10 according to an embodiment of the present invention. As shown in FIG. 3, the server device 10 according to the embodiment may comprise a game program storage unit 51, a player specifying information storage unit 52, an owned quantity storage unit 53, a trade condition information receiving unit 54, a trade condition information storage unit 55, a trade rate information generating unit 56, a trade rate information presenting unit 57, a trade condition updating request receiving unit 58, a trade condition updating unit 59, an owned quantity updating unit 60, and a trade termination time updating unit 61.

As stated above, the game program storage unit 51 may store game programs for executing or operating various games executable or operable on the terminal device 30. A user of the terminal device 30 may obtain game programs stored on the game program storage unit 51 and run the obtained game programs on the terminal device 30, thereby to play the game on the terminal device 30. As stated above, various games may be performed on the terminal device 30. The games performed on the terminal device 30 may use various game contents such as electronic cards, items, and virtual currency used in the games.

The term "game contents" collectively refers to electronic data used by players for progressing the games and including, for example, cards, items, avatars, and virtual currency. Cards, items, and avatars, unlike virtual currency, do not function as currency either inside or outside games. Therefore, cards, items, avatars, and other game contents except virtual currency may be herein referred to as "non-currency game contents." In an embodiment of the present invention, the game contents may be obtained, owned, used, managed, exchanged, fused, reinforced, sold, discarded, and/or presented by players in the games in accordance with progression of the games; and the use of the game contents is not limited to those explicitly described herein. In selling of a card in a game, a player may be paid in virtual currency used in the game, not in real currency, for the card sold. A card used as a game content has parameters (e.g., "attribute," "level," "offensive power," and "defensive power") required for the progression of a game. These parameters may be updated as the game progresses. A player can progress the game using the card having updated parameters.

A player of a game corresponding to a game program stored on the game program storage unit 51 can obtain and own various game contents such as items in accordance with the progression of the game. The items used in games may include, for example, weapon items that may increase the offensive power of a character manipulated by a player, protector items that may increase the defensive power, vehicle items that may increase mobility, and restoration items that may restore parameters such as "life" and "hit point"; but the items of the present invention are not limited to those explicitly disclosed herein.

For example, the player specifying information storage unit 52 may store, for each player, player specifying information that specifies the player. The "player specifying information" may include any information that represents personality and characteristics of a player and specifies the player when presented to another player. In games, a display image representing a player may be generated based on the player specifying information, and the display image may be displayed in the game screen of another player to communicate the personality and the characteristics of the player to the other player. The display images representing the players may express the personalities of the players, thereby encouraging interaction between the players through the game.

The player specifying information may include, for example, player attribute information such as a player name or avatar set by the player to characterize the player. The player name may be desirably determined by the player; therefore, a plurality of players may possibly use the same player name. Accordingly, a player name may not uniquely specify a player, but practically it may serve as an indicator for specifying a player because the number of players interactively playing a game may be limited in terms of time. Therefore, a player name may be herein included in player specifying information that specifies a player. An avatar may also be included in player specifying information for the same reason. That is, many players may play games using avatars having distinctive appearance to express their personalities. To support such needs of players, various items for decorating avatars have been provided as a function of games or a platform for games. Accordingly, an avatar cannot always uniquely specify a player but practically serves for specifying a player.

The player specifying information storage unit 52 may store various player specifying information such as player names and avatars in association with player identification information of players. FIG. 4 is an example of a player specifying information table that may store player specifying information in association with player identification information of players. Avatars may be stored as, for example, images in JPEG format on the server device 10; the player specifying information management table may manage URLs indicating the location where the images are stored. The player specifying information may include various information occurring in progression of games, in addition to player attribute information desirably set by players such as user names and avatars. For example, the player specifying information may include player identification information (described later) that specifies a player.

The owned quantity storage unit 53 may store the quantity of game contents owned by players for each type of game content in association with player identification information of the players. FIG. 5 is an example of the owned quantity management table that may store owned quantity of game contents and may be included in the owned quantity storage unit 53. As shown in FIG. 5, the owned quantity management table according to an embodiment may store the quantities of item A, item B, item C, etc. owned by each player in association with the corresponding player identification information of the player. It should be noted that FIG. 5 is a mere example, and the owned quantity management table may store quantities of various game contents such as virtual cards and virtual currency, in addition to items. When a player newly obtains or consumes an item as the game progresses, the owned quantity of the item may be updated in the owned quantity management table so as to reflect the player activities in the game.

"Player identification information" may include an identification code that identifies a player of a game and may be composed of, for example, a six-digit number. The code system of the player identification information is not limited to those explicitly described herein and may be configured desirably. For example, the player identification information may also include an alphabetic character. Typically, the player identification information may be assigned to a player when, e.g., the player first logs in a game, and may be reused for later logins of the player. Thus, the player identification information may be unique to a player and identifies the player in a game.

In the example shown in FIG. 5, the player identified by the player identification number "000001" (hereinafter "player 1") owns 74 items A and 18 items C. Since player 1 does not own an item B, the field indicating the owned quantity of item B is set to "0." Also, the player identified by the player identification number "000002" (hereinafter "player 2") owns 12 items A, 2 items B, and 14 items C. The player identified by the player identification number "000003" (hereinafter "player 3") owns 89 items A and 13 items C. The owned quantity management table shown in FIG. 5 is a mere example and is susceptible of various modifications. Further, the game content identification information storage unit 52 is not necessarily required to store the owned quantity management table, but may use a desired technique known to those skilled in the art to store the quantity of game contents owned by each player in association with player identification information of the player. Players other than players 1 to 3 likewise own various game contents; the quantities of game contents owned by each player may be stored in association with player identification information of the player. Herein, the player identified by the player identification number "000004" in FIG. 5 may be referred to as player 4, and the player identified by the player identification number "000005" may be referred to as player 5.

Since game contents such as items may be obtained as necessary by a player in accordance with the progression of the game, the owned quantity management table may be also updated in accordance with the progression of the game so as to reflect the change in the quantity owned by the player. For example, when the player obtains three items A, "3" is added to the quantity of items A owned by the player; and when the player consumes one item B, "1" is subtracted from the quantity of items B owned by the player.

When a player of a game exchanges game contents with another player, the trade condition information receiving unit 54 may receive, from the player, trade condition information that determines conditions of the trade. The trade condition information sent from one player may include, for example, the type and quantity of game contents given to another player through the exchange, the player identification information of the one player, and the type and quantity of game contents desirably to be obtained from the other player through the exchange. For example, items to be exchanged as game contents may include rifle, shotgun, knife, bulletproof vest, coat, helmet, motorcycle, jeep, airplane, helicopter, restoration drink, and trap; but the types of items that can be exchanged in the present invention are not limited to these items.

The trade condition information storage unit 55 may store one or more trade condition information received by the trade condition information receiving unit 54. FIG. 6 shows an example of the trade condition information management table that is included in the trade condition information storage unit 55 and manages trade condition information. For example, when the trade condition information receiving unit 54 receives trade condition information from a player, the trade condition information storage unit 55 may generate a record for storing the trade condition information in the trade condition information management table. The record may be provided with "a trade ID" that identifies a trade based on the trade condition information; and the "trade ID" may be stored in the trade condition information management table in association with various information included in the trade condition information. The data stored in the trade condition information management table in association with a certain trade ID is herein referred to as "trade data" associated with the trade ID.

As shown in the figure, the trade condition information management table may include the columns of "Type Code of Game Content 1," "Trade Quantity of Game Content 1," and "Player Identification Information 1." For convenience of description, part or all of "Type Code of Game Content 1," "Trade Quantity of Game Content 1," and "Player Identification Information 1" may be herein also collectively referred to as "first trade condition information." "Type Code of Game Content 1" refers to the type of game contents given from one player to another player through an exchange. "Trade Quantity of Game Content 1" refers to the quantity of game contents specified by "Type Code of Game Content 1" and given from one player to another player. "Player Identification Information 1" refers to the player identification information of the one player. "Type Code of Game Content 1," "Trade Quantity of Game Content 1," and "Player Identification Information 1" may be included in trade condition information received from the one player. Alternatively, in another embodiment, "Type Code of Game Content 1," "Trade Quantity of Game Content 1," and "Player Identification Information 1" may be generated in the server device 10 based on the trade condition information. Thus, "first trade condition information" may hold the trade condition on which one player gives game contents to another player through an exchange.

Also, the trade condition information management table may also include the columns of "Type Code of Game Content 2," "Trade Quantity of Game Content 2," and "Player Identification Information 2." For convenience of description, part or all of "Type Code of Game Content 2," "Trade Quantity of Game Content 2," and "Player Identification Information 2" may be herein also collectively referred to as "second trade condition information." "Type Code of Game Content 2" refers to the types of game contents to be exchanged for the game contents specified by "Type Code of Game Contents 1." "Trade Quantity of Game Content 1" refers to the quantities of the game contents specified by "Type Code of Game Contents 1." "Player Identification Information 2" refers to the player identification information of the other player who gives the game contents specified by "Type Code of Game Contents 2" to the one player. Thus, "second trade condition information" may hold the trade condition on which the other player gives game contents to the one player in exchange for the game contents specified by "Type Code of Game Content 1." "Trade data" identified by a certain trade ID may include "first trade condition information" indicating trade conditions for game contents of the one player and "second trade condition information" indicating trade conditions for game contents to be exchanged for the game contents; and therefore, "trade data" may determine the trade rate between these game contents.

As will be described later, each of "Type Code of Game Content 1," "Trade Quantity of Game Content 1," "Player Identification Information 1," "Type Code of Game Content 2," "Trade Quantity of Game Content 2," and "Player Identification Information 2" may be updated as required based on the trade condition information or trade condition update request sent from a player of the game to the server device 10.

The trade condition information management table may further contain "trade termination time" for each trade ID. "Trade termination time" may indicate the time when the exchange of items identified by the trade ID is terminated. For example, "trade termination time" may be the time one hour later than a reference time when the trade ID is generated. By way of an example, if a trade ID is generated at 7:51 am on April 9, "trade termination time" may be 8:51 am on April 9, which is one hour thereafter. As will be described later, a trade rate between items may be determined based on a trade record stored in the trade condition information management table at the time when the trade is terminated. As will be described later, the trade termination time may be updated when other data stored in the trade condition information management table is updated.

The trade termination time may be provided to a game played by the player while being included in trade rate information, which will be described later. When the trade termination time is included in the trade rate information, the trade termination time may be displayed in a display screen of the terminal device 30. In another embodiment, the trade rate information may not include the trade termination time so that the trade termination time is not informed to players.

In the example shown in FIG. 6, the trade condition information management table stores "Type Code of Game Content 1" set to an item type code "bbbb" representing item B, "Trade Quantity of Game Content 1" set to "2," and "Player Identification Information 1" set to "002987," in association with a trade ID "A000004." The trade record with the trade ID "A000004" may be generated when, for example, trade condition information is received from the player identified by the player identification information "002987," the trade condition information including the item type code "bbbb" identifying item B, information specifying the quantity "2" of item B, and the player identifying information "002987." The first trade condition information may be generated at the terminal device 30 of the player of the player identification information "002987" and sent to the server device 10 when the player desires to provide another player with two items B and obtain other items from the other player. If the trade condition information does not include information that specifies game contents desirably to be obtained from the other player, no information may be stored in the fields of "Type Code of Game Content 2," "Trade Quantity of Game Content 2," and "Player Identification Information 2," as shown in the record with a trade ID "A000004" in FIG. 6.

Further, in the example shown in FIG. 6, the record with a trade ID "A000005" may have "Type Code of Game Content 1" set to an item type code "aaaa," "Trade Quantity of Game Content 1" set to "40," "Player Identification Information 1" set to "038349," "Type Code of Game Content 2" set to an item type code "ffff," and "Trade Quantity of Game Content 2" set to "10." The trade record with the trade ID "A000005" may be generated when the player of the player identification information "038349" wants to obtain 10 items F in exchange for 40 items A, and trade condition information based on such trade condition is received from the player. Although the record with the trade ID "A000005" does not contain any information in the field "Player Identification Information 2," the field may be filled with player identification information of another player when trade condition information related to the trade ID "A00005" and specifying the quantity of items F identified by the item type code "ffff" is received from the other player.

Further, the record with a trade ID "A000001" in FIG. 6 shows an example where trade condition information or a trade condition updating request is received from another player. As shown, the record with a trade ID "A000001" has "Type Code of Game Content 1" set to an item type code "aaaa," "Trade Quantity of Game Content 1" set to "50," "Player Identification Information 1" set to "000001," "Type Code of Game Content 2" set to an item type code "bbbb," "Trade Quantity of Game Content 2" set to "1," and "Player Identification Information 2" set to "000002." This record may be generated when, for example, the player of player identification information "000001" wants to exchange his own 50 items A for item B owned by another player, and the player identified by the player identification information "000002" responds to this desired exchange and offers trade condition of providing one item B.

As will be described later, the data stored in the trade condition information management table may be presented to other players through, e.g., play screens of the game. For example, the information included in the record with a trade ID "A000001" may be presented to players of the game through the game; therefore, the players may come to know that a condition for exchanging 50 items A for one item B is offered. The players can send, to the server device 10, a trade condition updating request that specifies a condition more advantageous than that already offered; and the server device 10 can update the trade condition information management table based on the trade condition updating request. The updating of the trade condition information management table will be described in detail later.

In response to, for example, a search request from a player, the trade rate information generating unit 56 may generate, for each trade ID stored in the trade condition information management table, trade rate information including the trade quantity of game content 1 and the trade quantity of game content 2 associated with the trade ID. As will be described later, the generated trade rate information may be displayed in a display screen on the terminal device 30 as part of a game screen when the game is played on the terminal device 30. A player may view the trade rate information displayed on the terminal device and may come to know the trade rate at which game contents are exchanged.

In response to, e.g., a request from a player, the trade rate information presenting unit 57 may present, to the player, trade rate information generated by the trade rate information generating unit 56. The player playing a game can send a display request for trade rate information to the server device 10, through operation of the terminal device 30 performing the game. The trade rate information presenting unit 57 can send trade rate information to the game performed on the terminal device 30 which has sent the display request. The terminal device 30 can display a trade rate display screen generated from the trade rate information as, for example, part of a display screen of the game.

A player who viewed the trade rate display screen can send a trade condition updating request from the terminal device 30 to the server device 10, thereby to offer more advantageous trade condition than the trade rate displayed in the trade rate display screen. For example, in the case where the trade rate display screen displays the trade rate between item A and item B, a player who viewed the trade rate display screen can generate a trade condition updating request for offering a more advantageous trade rate than the trade rate displayed in the trade rate display screen for a desired one of item A and item B, through operation of the terminal device 30.

The trade condition updating request may be received by a trade condition updating request receiving unit 58 of the server device 10. When the trade condition updating request is received by the trade condition updating request receiving unit 58 prior to the trade termination time, the trade condition updating unit 59 may compare the trade quantity of the game contents associated with the trade ID specified by the trade condition updating request, with the trade quantity of the game contents included in the trade condition updating request. If the trade quantity included in the trade condition updating request is greater than the trade quantity stored in the trade condition information management table at the time when the trade condition updating request is received, the trade condition updating unit 59 may update the fields of "Trade Quantity of Game Content 1" and "Player Identification Information 1" of the trade condition information management table so as to include the trade quantity included in the trade condition updating request and the player identification information of the player who has sent the trade condition updating request.

For example, the record with a trade ID "A000001" in FIG. 6 may store an exchange rate of 50 items A to one item B. When the player identified by the player identification information "000003" (player 3) desires item B in exchange of item A, player 3 may generate a trade condition updating request including the trade quantity of his own items A to be provided. Conversely, when player 3 desires item A in exchange of item B, player 3 may generate a trade condition updating request including the trade quantity of his own items B to be provided. The generated trade condition updating request may be sent to the server device 10. For example, player 3 may generate a trade condition updating request including the trade ID "A000001," item type information "aaaa" that specifies item A, and a trade quantity "60" of item A, that is then sent to the server device 10. The trade condition updating request may be received by a trade condition updating request receiving unit 58. When the trade condition updating request is received prior to the trade termination time, the trade condition updating unit 59 may compare the trade quantity of items A associated with the trade ID "A000001" included in the trade condition updating request (i.e., "50" in FIG. 6), with the trade quantity "60" of items A included in the trade condition updating request. In this case, the trade quantity of items A included in the trade condition updating request may be greater; therefore, the trade condition updating unit 59 may update the fields of "Trade Quantity of Game Content 1" and "Player Identification Information 1" in the trade condition information management table associated with the trade ID "A000001," such that these fields store the trade quantity "60" included in the trade condition updating request and the player identification information "000003" of the player who has sent the trade condition updating request, respectively.

As stated above, the trade condition stored in the trade condition information management table can be updated based on the trade condition updating request. FIG. 7 shows an example of trade condition information management table after updating.

In the example shown in FIG. 7, the record of trade ID "A000001" has "Trade Quantity of Game Content 1" set to "60" instead of "50" originally stored and "Player Identification Information 1" set to "000003" instead of "000001" originally stored. Thus, the first trade condition information and/or the second trade condition information stored in the trade condition information management table can be updated when a better trade rate is offered by the trade condition updating request.

The trade termination time updating unit 61 may update trade termination time assigned to each trade ID based on a trade condition updating request. For example, the trade termination time updating unit 61 may update the trade termination time stored in the trade condition information management table for a certain trade ID based on the time when a trade condition updating request related to the trade ID is received by the trade condition updating request receiving unit 58. For example, in the example shown in FIG. 6, the record of trade ID "A000001" has trade termination time set to "April 9 8:51." If a trade condition updating request related to the trade ID "A000001" is received prior to this trade termination time, the originally stored trade termination time may be replaced with, for example, "April 9 9:51," that is, one hour later than the originally stored trade termination time.

In the example of trade condition information management table after updating shown in FIG. 7, the record of trade ID "A000001" has "Trade Termination Time" set to "April 9 9:51" after updating.

The trade rate assigned to each trade ID in the trade condition information management table may be concluded at the trade termination time associated with the trade ID. When the trade termination time is updated, the trade rate may be concluded at the updated trade termination time. More specifically, a trade condition may be concluded between the player identified by the player identification information stored in "Player Identification Information 1" (hereinafter referred to as "first player" for convenience) and the player identified by the player identification information stored in "Player Identification Information 2" (hereinafter referred to as "second player" for convenience) as follows: the first player may give the second player the game contents stored in "Type Code of Game Content 1" (hereinafter referred to as "first game contents" for convenience) in the quantity stored in "Trade Quantity of Game Content 1," and in exchange, the second player may give the first player the game contents stored in "Type Code of Game Content 2" (hereinafter referred to as "second game contents" for convenience) in the quantity stored in "Trade Quantity of Game Content 2." That is, a trade may be concluded in the game to exchange the first game contents and the second game contents between the first player and the second player at a trade rate determined by the trade quantity of first game contents and the trade quantity of second game contents. For example, in the example shown in FIG. 7, when the trade termination time "April 9 9:51" associated with the trade ID "A000001" is reached, a trade may be concluded wherein player 3 of player identification information "000003" gives 60 items A to player 2 of the player identification information "000002" and receives one item B in exchange, When a trade termination time for a record specified by a certain trade ID is reached, the owned quantity updating unit 60 may update the owned quantities of first game contents and the second game contents stored in the owned quantity management table based on the first trade condition information and the second trade condition information stored in the trade condition information management table at the trade termination time. For example, with respect to the trade record specified by the trade ID "A000001" in FIG. 7, the owned quantity updating unit 60 may subtract, at the trade termination time, the trade quantity "60" included in the first trade condition information from the owned quantity "89" of items A (the first game contents) associated with the player identification information of player 3 in the owned quantity management table, and add, at the trade termination time, the trade quantity "1" included in the second trade condition information to the owned quantity of items B (the second game contents) associated with the player identification information of player 3 in the owned quantity management table. Also, the owned quantity updating unit 60 may subtract, at the trade termination time, the trade quantity "1" included in the second trade condition information from the owned quantity of items B associated with the player identification information of player 2 in the owned quantity management table, and add, at the trade termination time, the trade quantity "60" included in the first trade condition information to the owned quantity of items A associated with the player identification information of player 2 in the owned quantity management table.

The owned quantity management table thus updated is shown in FIG. 8. As shown in FIG. 8, the quantity of items A owned by player 2 is increased by 60 from "12" to "72" after the exchange, while the quantity of items B owned by player 2 is decreased by 1 from "2" to "1" after the exchange. Meanwhile, the quantity of items A owned by player 3 is decreased by 60 from "89" to "29" after the exchange, while the quantity of items B owned by player 3 is increased by 1 from "0" to "1" after the exchange. Thus, if a trade is concluded between player 2 and player 3 wherein player 2 gives one item B to player 3, and in exchange, player 3 gives 60 items A to player 2, the exchange is reflected on the owned quantities stored in the owned quantity management table.

Figure 9:
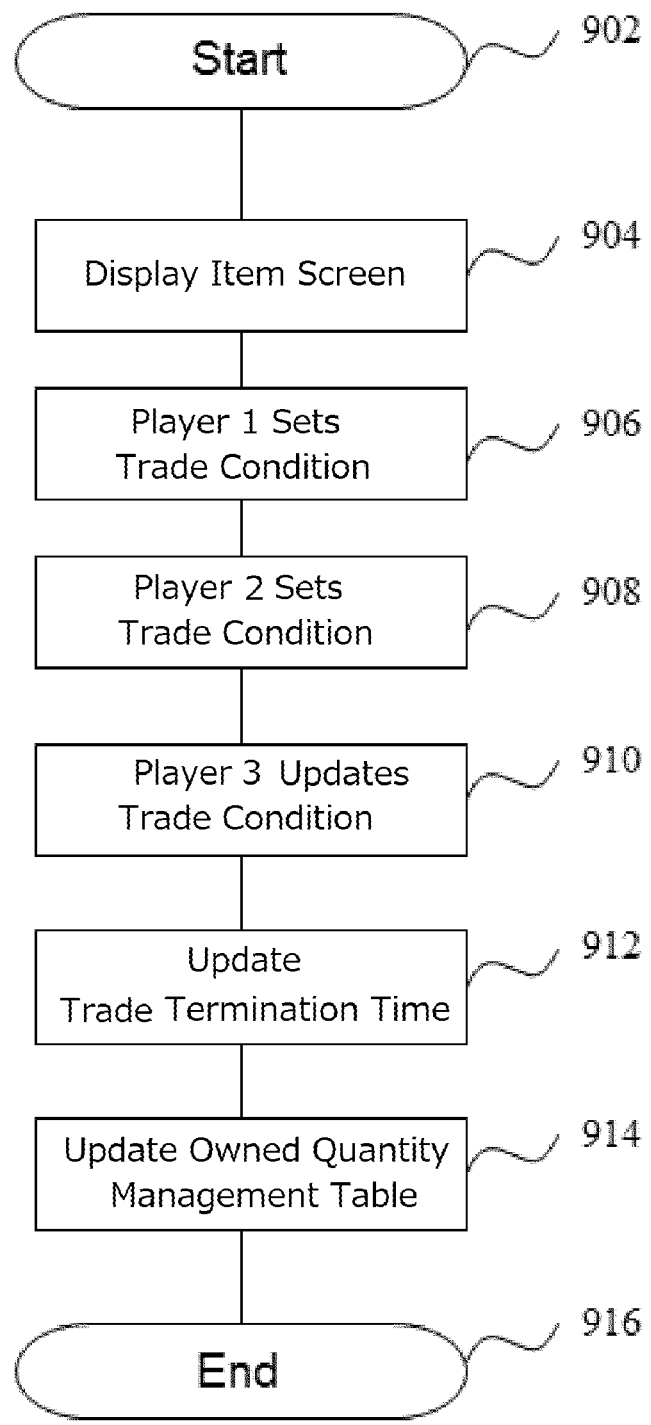
FIG. 9 is a flowchart showing an example of process for exchanging game contents using a video game system according to an embodiment of the present invention.

Next, the processing of exchanging game contents in a game system configured as stated above will be further described with reference to FIG. 9. FIG. 9 is a flowchart showing an example of processing of exchanging an item termed "restoration drink" and an item termed "ground vehicle" in a game by using a game system according to an embodiment of the present invention. The "restoration drink" and "ground vehicle" are mere examples of game contents, and other desired game contents may be traded in the present invention in accordance with the processing shown in FIG. 9. Additionally, FIG. 9 shows an example wherein game contents are exchanged between player 1, player 2, and player 3; but a desired number of players can trade game contents in accordance with the processing shown in FIG. 9.

First, the processing of exchanging game contents may be started in step 902. In this step, player 1 may operate his own terminal device 30 to obtain a desired game program from the server device 10 and run the game program on the terminal device 30. Next, in step 904, player 1 may operate the terminal device 30 in response to an instruction from the game program to show an item owned by player 1 in the game on the screen of the terminal device 30. For example, a main screen of the performed game displayed on the terminal device 30 may contain links or operation buttons labeled "Items," "Treasures," "Belongings," etc. Player 1 can operate these links or operation buttons to show part or all of items owned by player 1.

Figure 10:
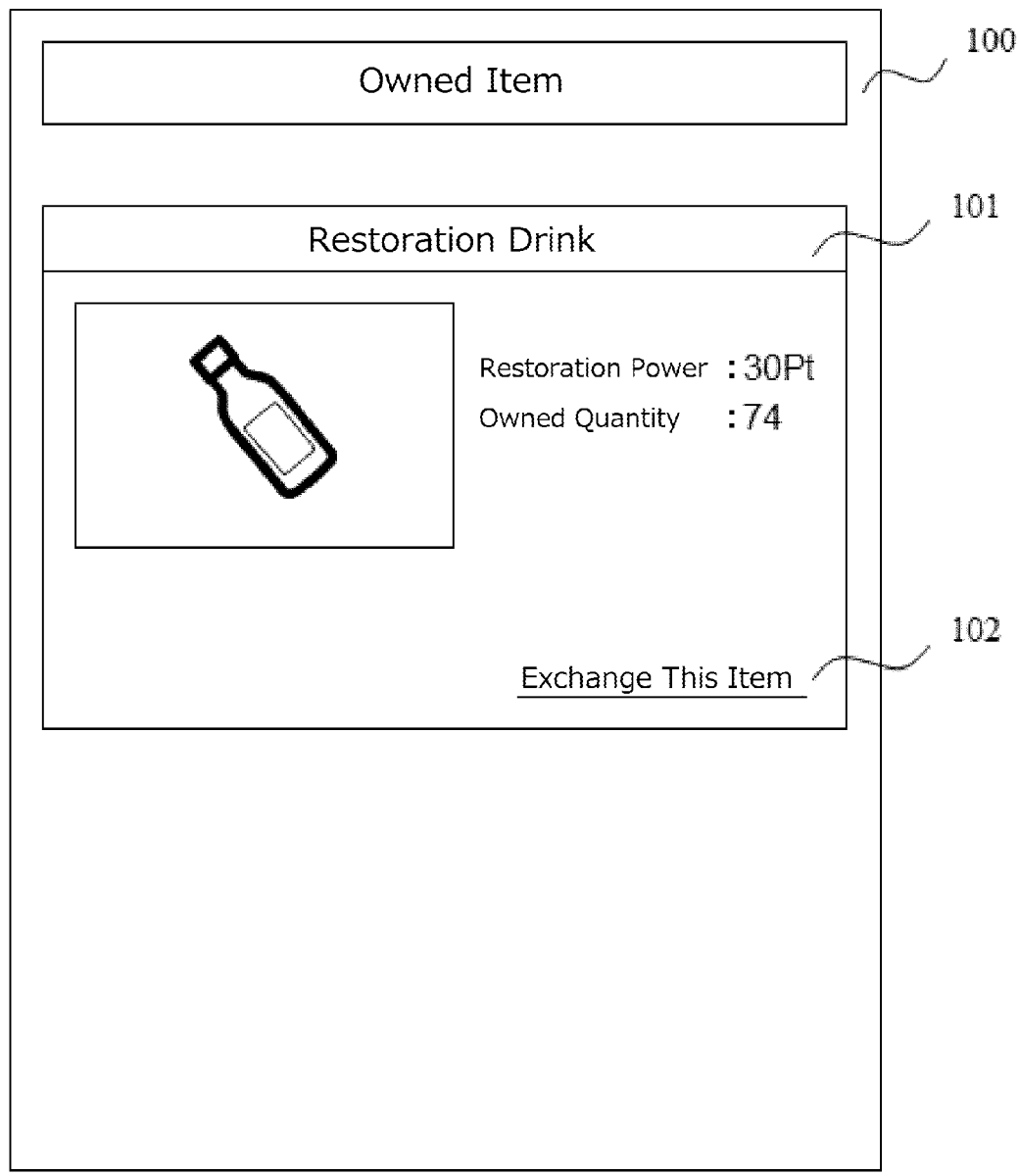
FIG. 10 shows an example of an item displayed in a game system according to an embodiment of the present invention.

FIG. 10 shows an example of an item displayed in a game system according to an embodiment of the present invention. For example, when player 1 operates an icon labeled "Belongings," the display screen 100 shown in FIG. 10 may be displayed in a display screen of the terminal device 30 of player 1. As shown in the owned quantity management table in FIG. 5, player 1 has 74 items A; and thus a display image 101 representing the item of "restoration drink" corresponding to item A may be displayed on the terminal device 30 of player 1. The display image 101 may include the name of the item "Restoration Drink," an image representing the item, parameters of the item (restoration power 30 Pts), the owned quantity of the item (74), and a link 102 to the setting screen of the trade conditions for the item. The display image 101 may include various information other than that illustrated in FIG. 10.

Figure 11:
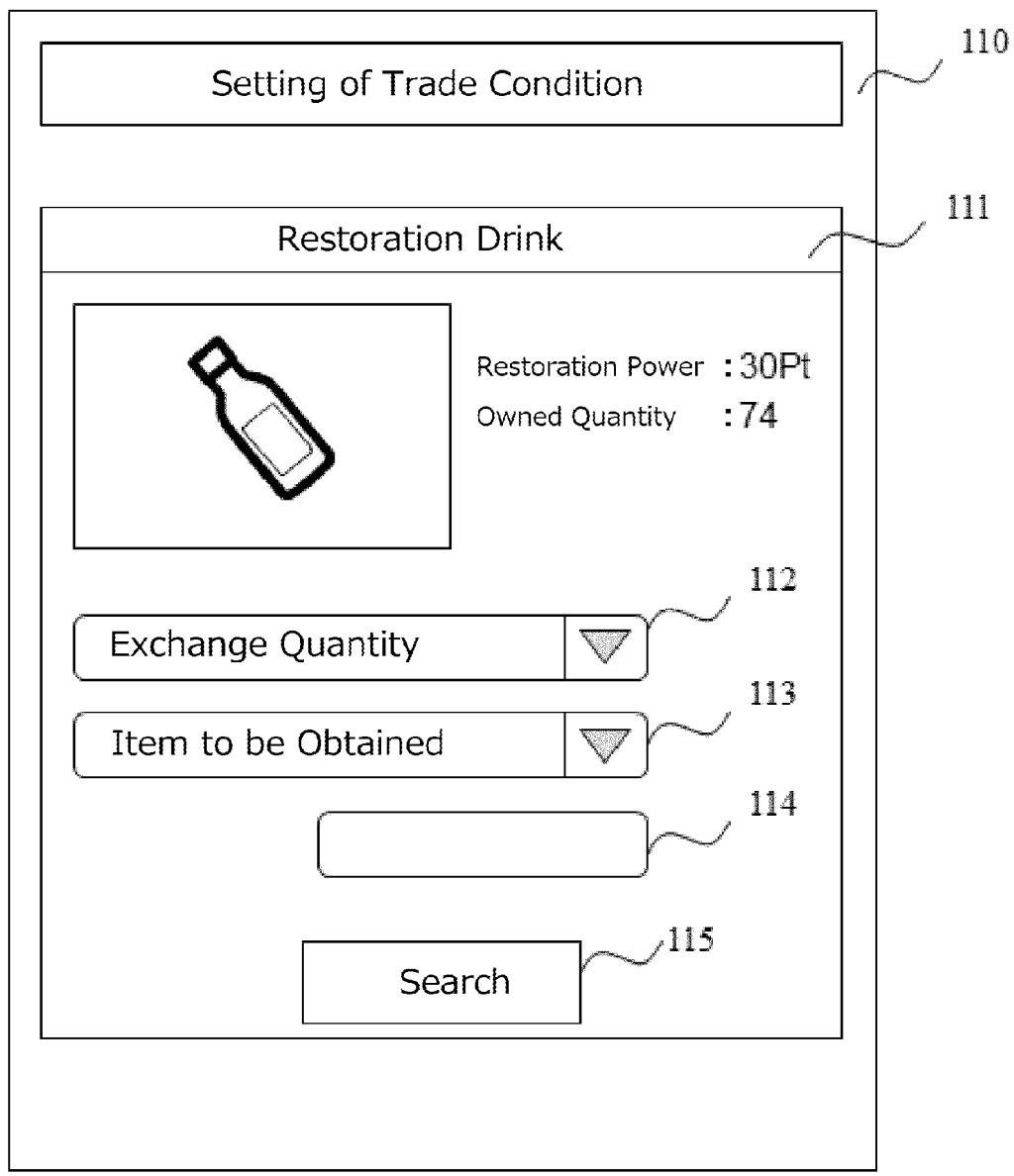
FIG. 11 shows an example of a trade condition setting screen for setting trade condition information of an item in a video game system according to an embodiment of the present invention.

When player 1 selects the link 102, the process may proceed to step 906 where a trade condition setting screen for setting trade conditions for the item may be displayed on the terminal device 30 of player 1. FIG. 11 shows an example of the trade condition setting screen. As shown, the trade condition setting screen 110 may include a setting image 111 for setting trade conditions for "Restoration Drink" to be provided from player 1 to another player. The setting image 111 may include a pulldown box 112 for designating the quantity (trade quantity) of "Restoration Drink" provided from player 1 to the other player, a pulldown box 113 for designating the type of the item desirably to be obtained from the other player in exchange for "Restoration Drink," an input box 114 for designating the quantity of the item, and a confirmation button 115 for confirming the designated trade conditions. The pulldown box 112 may provide a limited number of options (e.g., 10-increment options ranging from 10 to 200 such as "10," "20," and "200") indicating the quantity of the items to be provided to the other player; and player 1 selects from the options a value equal to or smaller than the quantity of his own items A such as "50." The pulldown box 113 may provide a plurality of options indicating the types of the item. For example, the pulldown box 113 may provide options such as "shotgun," "bulletproof vest," "ground vehicle," and "helicopter"; and player 1 may select, for example, "ground vehicle" from the options. Then, player 1 may input, for example, "1" into the input box 114 for the quantity of "ground vehicle." After inputting all the trade conditions, player 1 may select the confirmation button 115 to confirm the trade condition information to be informed to the server device 10.

When the confirmation button 115 is selected, the trade condition information may be sent to the server device 10, the trade condition information including the item type code "aaaa" that specifies "restoration drink" provided by player 1, the quantity "50" of "restoration drink," the game content type code "bbbb" that specifies "ground vehicle" wanted by player 1, the quantity "1" of "ground vehicle," and the player identification information "000001" of player 1. The server device 10 may receive the received trade condition information via the trade condition information receiving unit 54. Subsequently, the trade condition information storage unit 55 may generate a trade ID "A000001" for specifying the trade related to the trade condition information; and the trade ID "A00001" and the various information included in the trade condition information may be stored into the trade condition information management table in association with each other. More specifically, the first trade condition information stored in association with the trade ID "A000001" may include the item type code "aaaa" that specifies "restoration drink," the quantity "50" of the "restoration drink," and the player identification information "00001" of player 1 Additionally, the second trade condition information stored in association with the trade ID "A000001" may include the game content type code "bbbb" that specifies "ground vehicle" wanted by player 1 and the quantity "1" thereof. Immediately after the trade ID "A000001" is generated, no player may have made an offer of exchange; therefore, player identification information 2 may contain no information.

Subsequently, in step 908, player 2 may set the trade condition information. When playing the same or similar game as player 1 on the terminal device 30, player 2 can use the search function provided by the game to retrieve, from the trade condition information management table, information in the trade record where "restoration drink" is to be exchanged. For example, based on the search request from the player, the trade rate information generating unit 56 may specify the trade ID "A000001" where "restoration drink" is to be exchanged, and may generate trade rate information including the trade quantity of "restoration drink" and the trade quantity of "ground vehicle" associated with the trade ID "A000001." The generated trade rate information may be provided to the game performed on the terminal device 30 which has sent the search request. The trade rate information may include the trade ID "A000001." The terminal device 30 may generate a display screen of trade rate information (trade rate screen) based on the trade rate information, and may display the generated trade rate screen in the display screen as part of the game screen.

Figure 12:
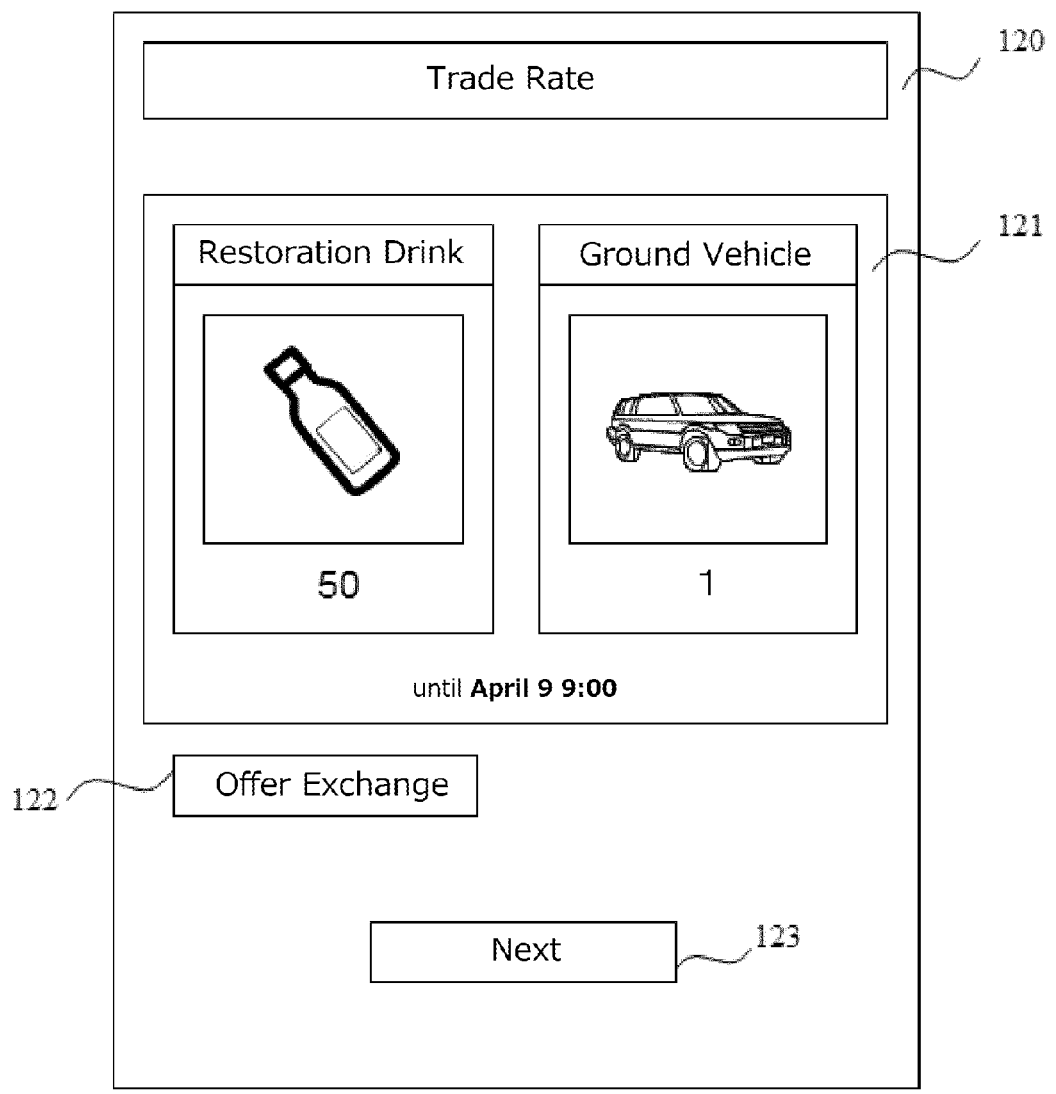
FIG. 12 shows an example of a trade rate screen for displaying trade rate information in a video game system according to an embodiment of the present invention.

FIG. 12 shows an example of a trade rate screen 120 for displaying trade rate information in a game system according to an embodiment of the present invention. As shown, the trade rate screen 120 may include an exchange item display image 121 including an image representing "restoration drink" and the characters "50" indicating the trade quantity thereof, and an image representing "ground vehicle" and the character "1" indicating the trade quantity thereof associated with the trade ID "A000001." Player 2 may view this trade rate screen 120 and come to know the trade rate (exchange rate) for exchanging 50 "restoration drinks" for one "ground vehicle." The trade condition information management table shown in FIG. 6 may also store trade condition information of trade IDs "A000002" and "A000005" in which "restoration drinks" are to be exchanged. Accordingly, the game performed on the terminal device 30 of player 2 may also be provided with trade rate information generated based on the trade IDs "A000002" and "A000005." Player 2 can select an operation button 123 located in the lower part of the display screen 120 and labeled "Next" to show a trade rate screen on the terminal device 30, the trade rate screen displaying trade rate information generated based on the trade ID "A000002" and/or the trade ID "A000005."

Figure 13:
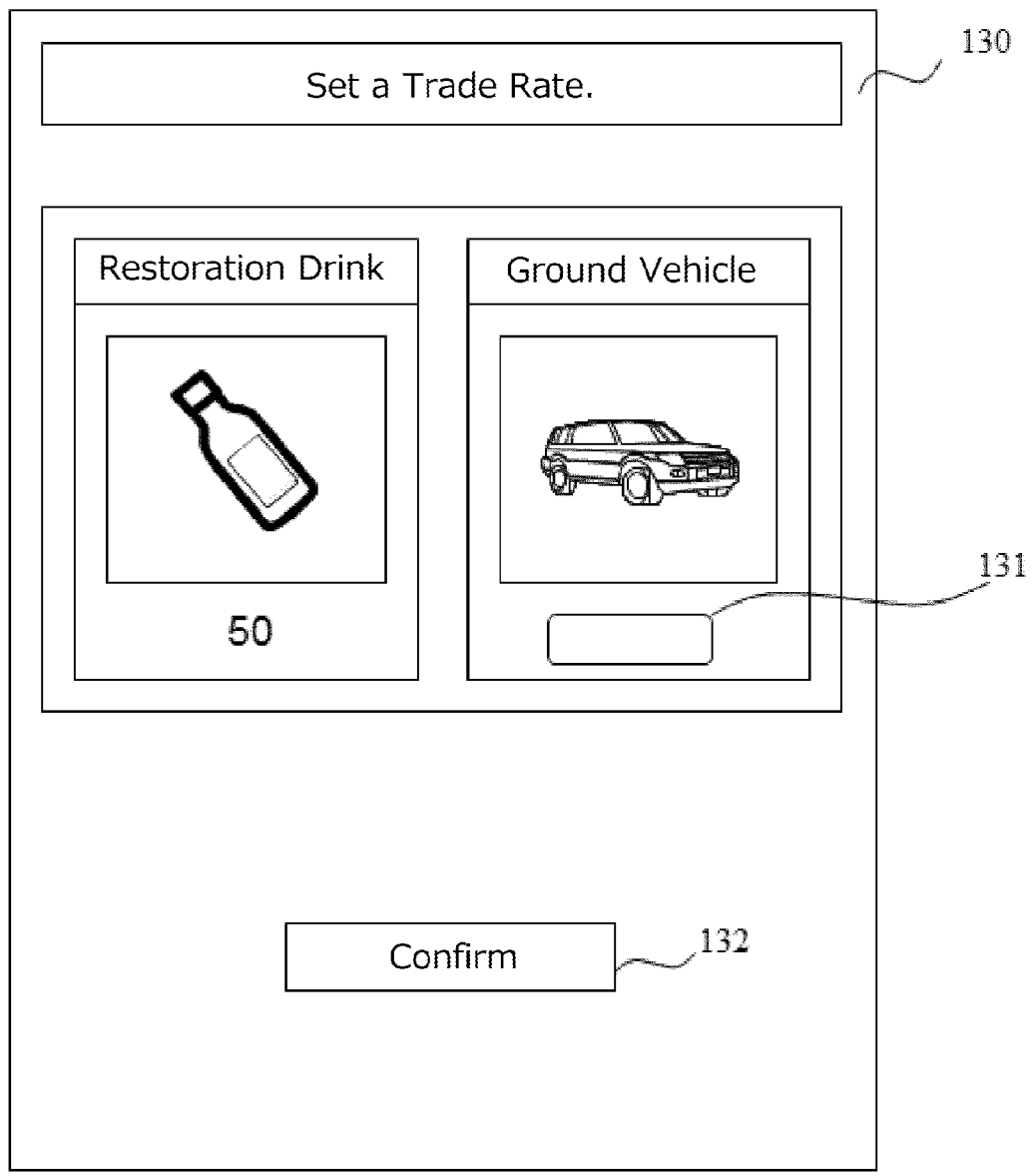
FIG. 13 shows an example of a trade rate setting screen for setting a trade rate of an item in a video game system according to an embodiment of the present invention.

The display screen 120 may display an operation button 122 labeled "Offer Exchange" below the image representing "restoration drink." When player 2 selects the operation button 122, the display screen on the terminal device 30 of player 2 may transition to a trade rate setting screen 130 for setting a trade rate, as shown in FIG. 13. The trade rate setting screen 130 shown in FIG. 13 may include an input box 131. Player 2 can input into the input box 131 the trade quantity of "ground vehicles" to be provided to the partner of the exchange to obtain 50 "restoration drinks." Supposing that player 2 inputs "1" into the input box 131 and selects the confirmation button 132, trade condition information may be sent to the server device 10, the trade condition information including the trade ID "A000001," the game content type code "bbbb" that specifies "ground vehicle," the quantity "1" of the "ground vehicle," and the player identification information "000002" of player 2.

The trade condition information sent from player 2 may be received by the trade condition information receiving unit 54.

Next, the trade condition information storage unit 55 may store the quantity "1" of the "ground vehicle" and the player identification information "000002" of player 2 included in the trade condition information as second trade condition information in association with the trade ID "A000001" included in the received trade condition information.

Figure 14:
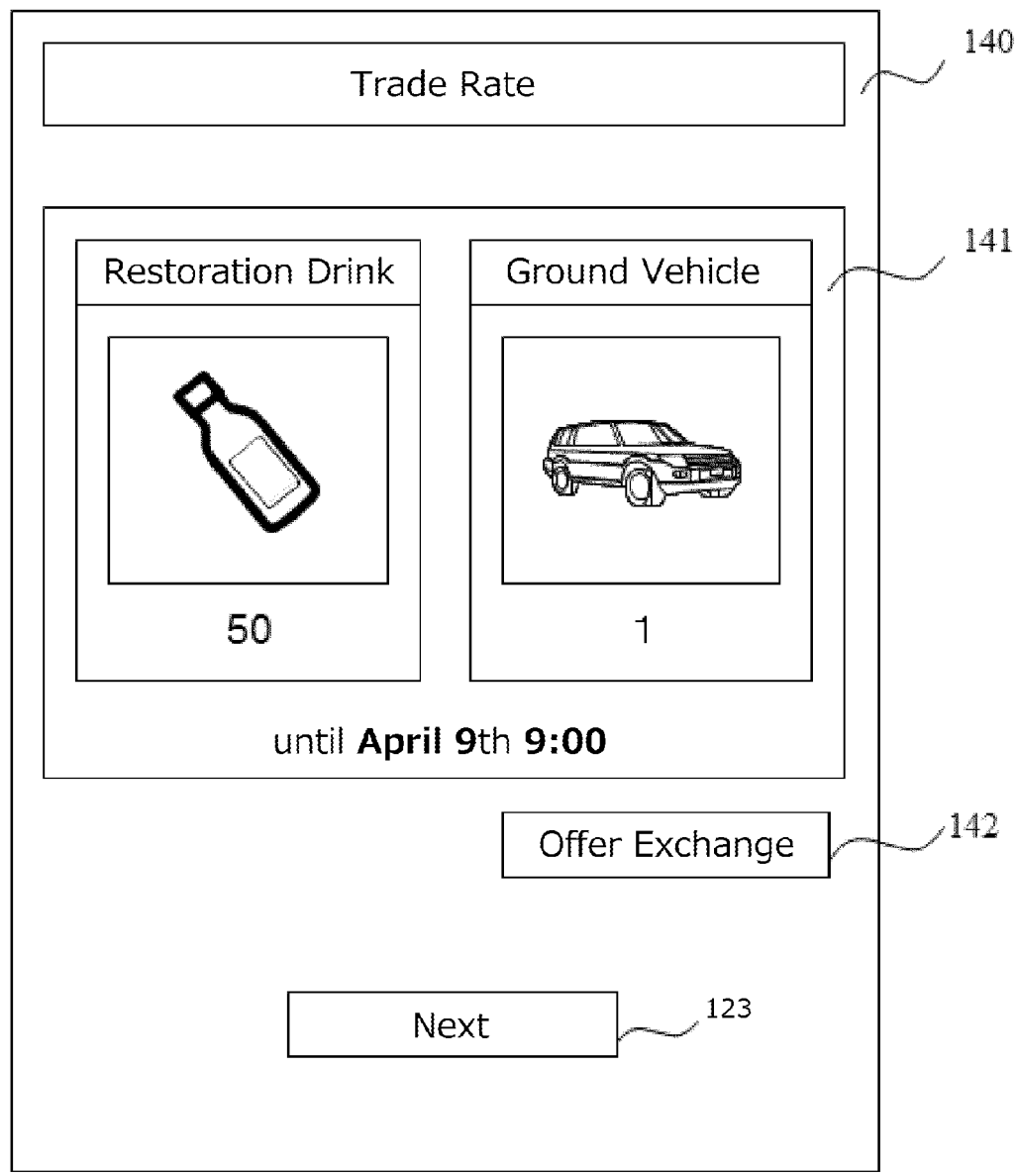
FIG. 14 shows an example of a trade rate screen for displaying trade rate information in a video game system according to an embodiment of the present invention.

Next, in step 910, player 3 who desires to obtain the "ground vehicle" may input trade condition information. Player 3 may search the trade condition information management table for records in which "ground vehicle" is to be exchanged, in the same manner as has already been described for player 2. Based on the search result, trade rate information may be generated as described above; and the generated trade rate information may be presented to the game played by player 3. The terminal device 30 of player 3 may generate a display screen of trade rate information (trade rate screen) shown in FIG. 14 based on the trade rate information, and displays the generated trade rate screen 140 in the display screen as part of the game screen. In the trade rate screen 140, an operation button 142 labeled "Offer Exchange" may be positioned below the image of "ground vehicle," not below the image of "restoration drink."

Figure 15:
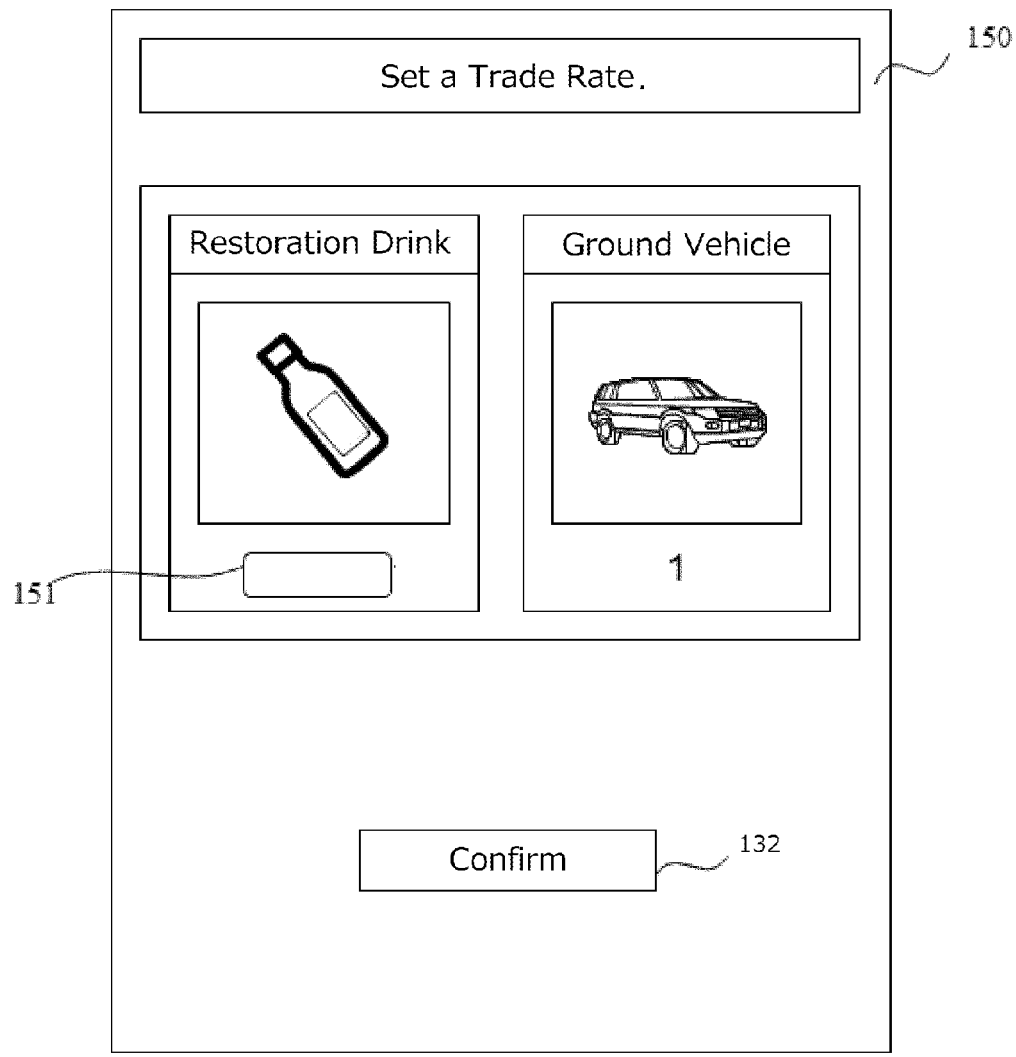
FIG. 15 shows an example of a trade rate setting screen for setting a trade rate of an item in a video game system according to an embodiment of the present invention.

Next, when player 3 selects "Offer Exchange" button, a trade rate setting screen may be displayed on the terminal device 30 of player 3. FIG. 15 shows an example of the trade rate setting screen displayed on the terminal device 30 of player 3. The trade rate setting screen shown in FIG. 15 may be almost the same as the trade rate setting screen 130 shown in FIG. 13, except that the input box 151 for inputting the trade quantity of the items to be provided to an exchange partner may be displayed below the image of "restoration drink," not below the image of "ground vehicle." Player 3 may input a desired trade quantity, e.g., "60" into the input box 151 as the quantity of "restoration drinks." Next, when player 3 selects the confirmation button 132, a trade condition updating request may be sent to the server device 10, the trade condition updating request including the trade ID "A000001," the game content type code "aaaa" that specifies the "restoration drink," the quantity "60" of the "restoration drink" inputted by player 3, and the player identification information "000003" of player 3.

The trade condition updating request sent from player 3 may be received by the trade condition updating request receiving unit 58. If the trade condition updating request is received prior to the trade termination time (April 9 9:00) for the trade ID "A000001," the trade condition updating unit 59 may compare the quantity "50" of the "restoration drink" associated with the trade ID "A000001" in the trade condition information management table and the quantity "60" of the "restoration drink" included in the trade condition updating request. In this case, the quantity of the "restoration drink" included in the trade condition updating request may be greater than the quantity held in the trade condition information management table; therefore, the trade condition information management table may be updated such that the first trade condition information associated with the trade ID "A000001" includes the quantity "60" of the "restoration drink" included in the trade condition updating request and the player identification information "000003" of player 3.

More specifically, as shown in FIG. 7, "Trade Quantity of Game Content 1" associated with the trade ID "A000001" is updated from "50" to "60," and "Player Identification Information 1" is updated from "000001" to "000003." Supposing that player 3 inputs "40" for the trade quantity of "restoration drink," the trade quantity of the "restoration drink" inputted by player 3 may be smaller than the trade quantity of the "restoration drink" stored in the trade condition information management table; therefore, the trade condition information management table may not be updated.

Next, in step 912, in response to the updating operation of the first trade condition information associated with the trade ID "A000001," the trade termination time updating unit 61 may postpone the trade termination time associated with the trade ID "A000001" by, for example, one hour.

Next, in step 914, the owned quantity updating unit 60 may update, at the trade termination time associated with the trade ID "A000001," the owned quantity of the game contents stored in the owned quantity management table, based on the first trade condition information and the second trade condition information stored in the trade condition information management table in association with the trade ID "A000001." If the trade termination time is reached after the trade condition updating request is received from player 3 and the trade record of the trade ID "A000001" is updated as shown in FIG. 7, the trade rate may be concluded based on the first trade condition information (i.e., the information stored in "Type Code of Game Content 1," "Trade Quantity of Game Content 1," and "Player Identification Information 1") and the second trade condition information (i.e., the information stored in "Type Code of Game Content 2," "Trade Quantity of Game Content 2," and "Player Identification Information 2") in the trade record associated with the trade ID "A000001" shown in FIG. 7. The owned quantity of the game contents stored in the owned quantity management table may be updated based on the first trade condition information and the second trade condition information. In FIG. 7, "Player Identification Information 1" may store "000003" that identifies player 3, and "Player Identification Information 2" may store "000002" that identifies player 2; therefore, "Owned Quantity of Item A" and "Owned Quantity of Item B" in the owned quantity management table shown in FIG. 5 associated with each of "000003" and "000002" may be updated based on "Trade Quantity of Game Content 1" and "Trade Quantity of Game Content 2" in FIG. 7. That is, "60" stored in "Trade Quantity of Game Content 1" is subtracted from the owned quantity "89" of item A ("restoration drink") associated with "000003" in the owned quantity management table; and "1" stored in "Trade Quantity of Game Content 2" is added to the owned quantity "0" of item B ("ground vehicle"). Simultaneously, "60" stored in "Trade Quantity of Game Content 1" is added to the owned quantity "12" of item A ("restoration drink") associated with "000002" in the owned quantity management table; and "1" stored in "Trade Quantity of Game Content 2" is subtracted from the owned quantity "2" of item B ("ground vehicle").

Thus, the owned quantities of item A and item B may be updated; as a result, the updated owned quantity management table may be as shown in FIG. 8. After this updating operation, player 2 can play the game using 72 "restoration drinks" and one "ground vehicle," and player 3 can play the game using 29 "restoration drinks" and one "ground vehicle." As for player 1, since the trade for obtaining "ground vehicle" was not concluded, the owned quantity of "ground vehicle" remains "0." As described above, game contents may be exchanged between players based on the trade conditions inputted by the players.

If a trade condition updating request sent from a player other than player 3 to the server device 10 is received prior to the trade termination time, the trade condition information table may be further updated based on this request. This is not shown in FIG. 9. For example, player 4, who desires to obtain "restoration drink," may search the trade condition information management table for records in which "restoration drink" is to be exchanged, by using a search function provided by the game. Based on the search result, trade rate information including the trade quantity of "restoration drink" and the trade quantity of "ground vehicle" may be generated in the same manner as have already been described for player 3, and the generated trade rate information may be presented in the game of player 4.

As stated above, in the embodiments of the present invention, the trade condition information management table for managing exchange rates between game contents may be generated based on the trade condition information obtained from the terminal device 30 of a player. For example, an exchange rate between item A and item B (an exchange rate for exchanging, e.g., X items A and Y items B) may be set in the trade condition information management table, based on the trade condition information obtained from the terminal device 30 of player 1 including the trade quantity (X) of items A to be provided to another player and the trade condition information obtained from the terminal device 30 of player 2 including the trade quantity (Y) of items B to be provided to player 1 in exchange of items A of player 1. The trade rates managed in this trade condition management table may be updated as necessary based on a trade condition updating request from other players. Then, when a predetermined termination condition is satisfied (e.g., when a preset termination time is reached), an exchange may be concluded with the exchange rate stored in the trade condition information management table at this moment between the players who offered the exchange rate. Accordingly, even if certain parties try to conclude an exchange at a rate far deviated from fair exchange rates, such an exchange rate stored in the trade condition information management table may be updated based on a trade condition updating request obtained from another player offering a more advantageous exchange rate. Thus, the embodiments of the present invention may restrain trades with rates deviated from fair exchange rates, as compared to conventional systems where a partner and conditions of exchange are determined through offer and acceptance. In other words, the embodiments of the present invention may permit determination of a fairer trade rate (that is, a trade rate more based on market mechanism) than conventional systems where a trade rate of game contents is determined through offer and acceptance.

Unlike the auction system for determining prices of game contents, the system for exchanging game contents provided by the embodiments of the present invention can determine the exchange rate for exchanging game contents between players.

In the above example embodiments, a trade rate set based on trade condition information from player 1 and player 2 may be updated based on a trade condition updating request from player 3; and such trade condition updating requests may be received from various players at any time. For example, as stated above, player 3 may update the exchange rate between "restoration drink" and "ground vehicle," and then another player may further update the exchange rate.

Figure 16:
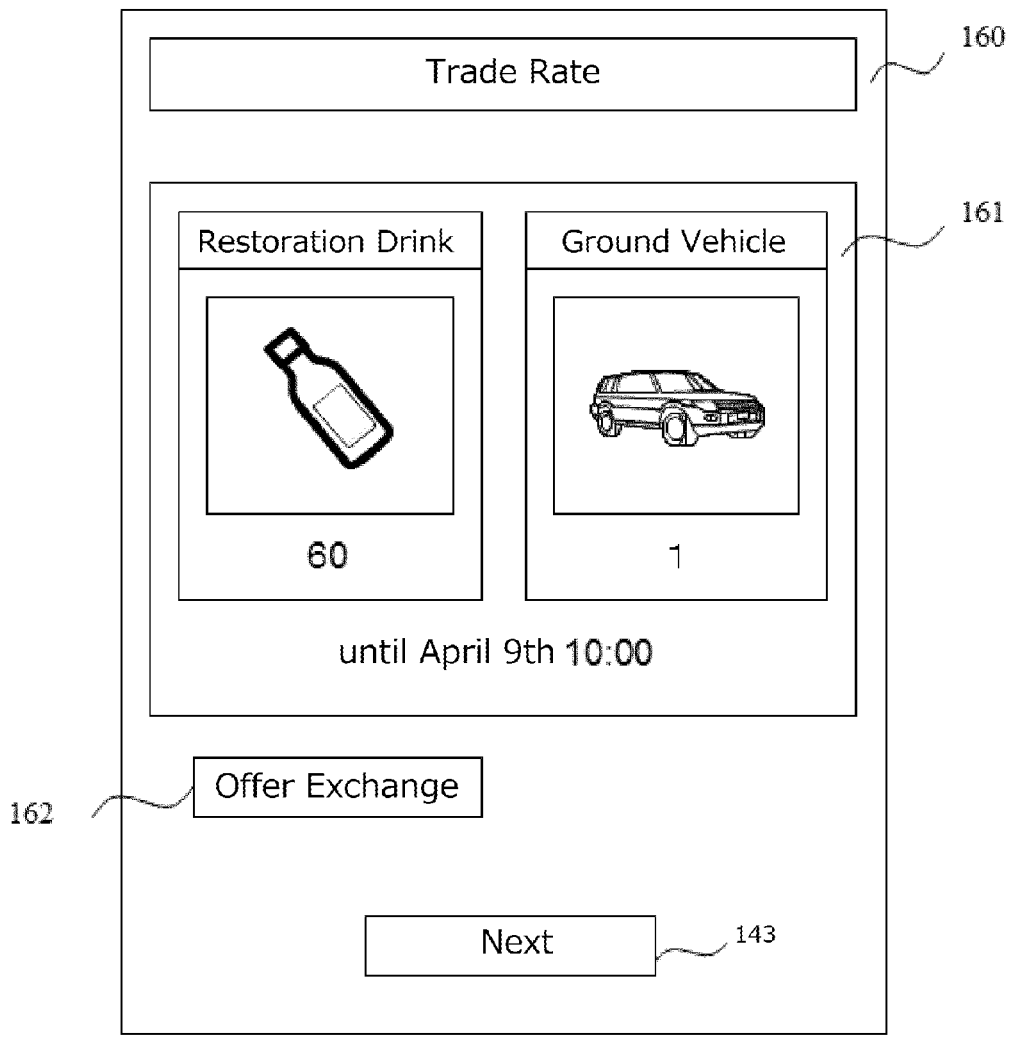
FIG. 16 shows an example of a trade rate screen for displaying trade rate information in a video game system according to another embodiment of the present invention.
Figure 17:
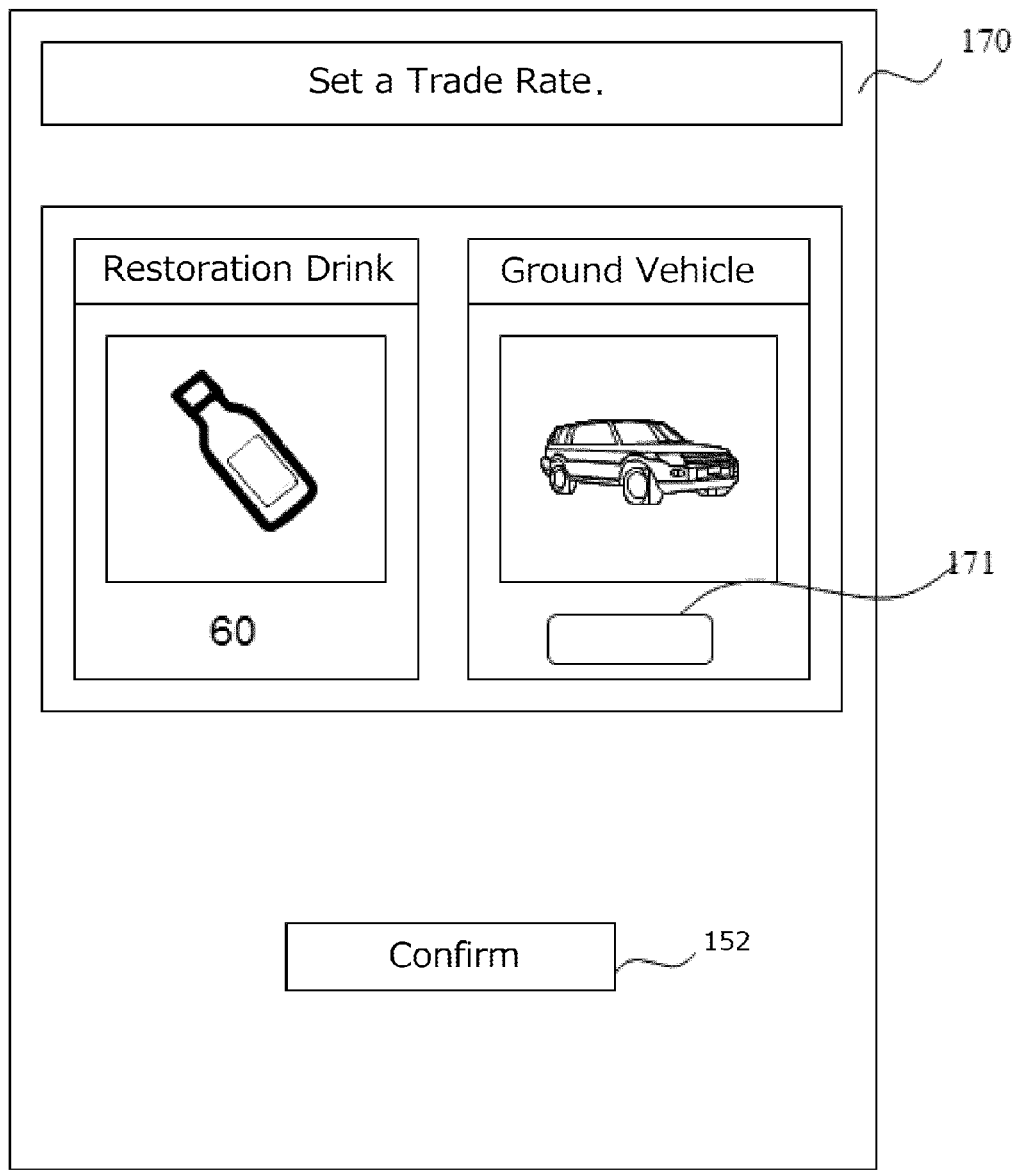
FIG. 17 shows an example of a trade rate setting screen for setting a trade rate of an item in a video game system according to another embodiment of the present invention.

FIG. 16 shows an example of trade rate screen displayed after the trade condition information management table is updated as shown in FIG. 7 based on the trade condition updating request from player 3; and FIG. 17 shows an example of trade rate setting screen linked from the trade rate screen shown in FIG. 16. In the trade condition information management table in FIG. 7, "Trade Quantity of Game Content 1" representing the trade quantity of "restoration drink" has been updated to "60"; therefore, the exchange item display image 161 in the trade rate setting screen 160 contains the quantity of "restoration drinks" being "60." When player 4 selects the operation button 162 on the trade rate screen 160 shown in FIG. 16, the display screen of the terminal device 30 may transition to the trade rate setting screen 170 shown in FIG. 17. In the trade rate setting screen 170, player 4 may input a trade quantity of "ground vehicle" into the input box 171.

When the confirmation button 172 is operated, a trade condition updating request including the trade quantity of "ground vehicle" inputted by player 4 and the player identification information of player 4 may be sent to the server device 10. The server device 10 may handle the trade condition updating request from player 4 in the same manner as the trade condition updating request received from player 3 and update the trade termination time and the owned quantity management table. Further, FIGS. 16 and 17 show examples of trade rate screen and trade rate setting screen displayed when player 4 searches for trade data in which "restoration drink" is to be exchanged to obtain "restoration drink" in exchange for "ground vehicle." Player 4 can also search for trade data in which "ground vehicle" is to be exchanged to obtain "ground vehicle," as can player 3. In this case, a display screen may be provided to player 4 to receive offered exchange of "ground vehicle," as is provided to player 3.

Figure 18:
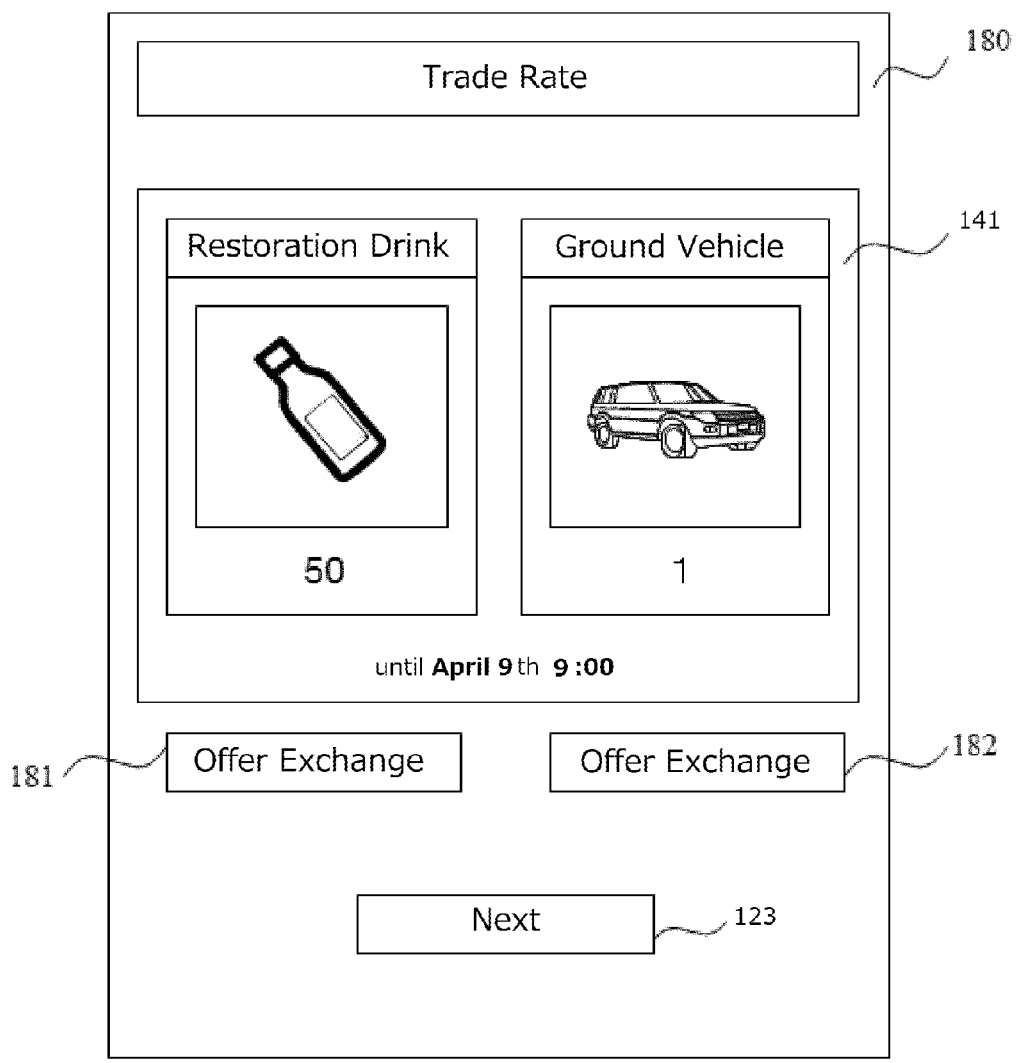
FIG. 18 shows an example of a trade rate screen for displaying trade rate information in a game system according to another embodiment of the present invention.

In another embodiment of the present invention, the trade rate screen may include operation buttons linked to the trade rate setting screen in association with each game content to be exchanged. FIG. 18 shows an example of trade rate screen according to another embodiment of the present invention. As shown, the trade rate screen 180 may include an operation button 181 labeled "Offer Exchange" in association with the restoration drink and an operation button 182 labeled "Offer Exchange" in association with the ground vehicle. A player may select the operation button 181 to obtain the restoration drink or select the operation button 182 to obtain the ground vehicle. When the operation button 181 is selected, the screen may transition to the same trade rate setting screen as shown in FIG. 13; and when the operation button 182 is selected, the screen may transition to the same trade rate setting screen as shown in FIG. 15.

The trade rate screen shown in FIG. 18 may be displayed on the terminal device 30 of a player when, e.g., the player requests from the server device 10 a summarized display of trade data stored in the trade condition information management table. For example, in response to the request for a summarized display from a player, the trade rate information generating unit 56 may generate, for each trade ID stored in the trade condition information management table, trade rate information including the trade quantities of game contents 1 and 2 associated with the trade ID and the operation buttons 181 and 182. This trade rate information may be sent from the trade rate information generating unit 57 to the terminal device 30 that sent the request for a summarized display; and the terminal device 30 displays a screen including both the operation buttons 181 and 182 based on the trade rate information, as the trade rate screen 180.

Thus, in an example shown in FIG. 18, one trade rate screen permits setting of an exchange rate by designating the quantity of the desired game content among the game contents to be exchanged.

The processes and procedures described and illustrated herein may be implemented by software, hardware, or any combination thereof, as well as that explicitly stated in the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if the processes and the procedures described in the specification are executed by a single apparatus, software, or component in the description, the processes and the procedures can be executed by a plurality of apparatuses, software, and components. Even if the data, tables, or databases described in the specification are stored in a single memory in the description, the data, tables, or databases may be dispersed and stored in a plurality of memories included in a single apparatus or in a plurality of memories dispersed and arranged in a plurality of apparatuses. The elements of the software and the hardware described in the specification can be integrated into fewer constituent elements or can be decomposed into more constituent elements.

With respect to the use of substantially any plural and/or singular terms herein, in addition to terms used without designation of being either plural or singular, those having skill in the art can translate from the plural to the singular and/or from the singular to the plural as is appropriate to the context.

What is claimed is:

1. A game system for providing a game on terminal devices of players, the system comprising:
   a central processing unit configured to execute computer programs;
   memory storage configured to store machine-readable instructions, when executed, causing the central processing unit to execute a game program to provide the game on the terminal devices, providing the game comprises:
   storing the game program for implementing the game on the terminal devices;
   storing owned quantities of first game content and second game content owned by each of a plurality of players of the game, in association with player identification information unique to each of the plurality of players;
   storing: first trade condition information including a trade quantity of the first game content set by a first player among the plurality of players, and player identification information of the first player; and second trade condition information including a trade quantity of the second game content set by a second player among the plurality of players, and player identification information of the second player, in association with each other;
   generating trade rate information including the trade quantity of the first game content and the trade quantity of the stored second game content;
   presenting the trade rate information in the game being played by a third player among the plurality of players;
   receiving a first trade condition updating request including at least one of a trade quantity of the first game content and a trade quantity of the second game content set by the third player;
   updating the first trade condition information so as to include the trade quantity and the player identification information of the third player included in the first trade condition updating request when the first trade condition updating request includes the trade quantity of the first game content and the trade quantity of the first game content is greater than the trade quantity included in the first trade condition information, and updating the second trade condition information so as to include the trade quantity and the player identification information of the third player included in the first trade condition updating request when the first trade condition updating request includes the trade quantity of the second game content and the trade quantity of the second game content is greater than the trade quantity included in the second trade condition information; and
   updating the owned quantities of the stored first game content and the second game content, based on the stored first trade condition information and the second trade condition information.

2. The game system of claim 1 wherein the updating of the owned quantities of the first game content and the second game content stored on the owned quantity storage unit is based on the stored first trade condition information and the stored second trade condition information at trade termination time.

3. The game system of claim 2, wherein, in response to the first trade condition updating request is received prior to the trade termination time, and the trade quantity included in the first trade condition updating request is greater than the trade quantity included in the first trade condition information, providing the game further comprises
   subtracting the trade quantity included in the first trade condition information at the trade termination time from the owned quantity of the first game content associated with the player identification information of the third player in the owned quantity storage unit,
   adding the trade quantity included in the second trade condition information at the trade termination time to the owned quantity of the second game content associated with the player identification information of the third player,
   unit subtracting the trade quantity included in the second trade condition information at the trade termination time from the owned quantity of the second game content associated with the player identification information of the second player, and
   adding the trade quantity included in the first trade condition information at the trade termination time to the owned quantity of the first game content associated with the player identification information of the second player.

4. The game system of claim 1, wherein providing the game further comprises
   presenting the trade rate information in the game being played by a fourth player included in the plurality of players;
   receiving from the fourth player a second trade condition updating request including a trade quantity of the first game content, the trade quantity being set by the fourth player; and,
   in response to the second trade condition updating request being received prior to trade termination time, and the trade quantity included in the second trade condition updating request being greater than the trade quantity included in the first trade condition information, updating the first trade condition information so as to include the trade quantity and player identification information of the fourth player included in the second trade condition updating request.

5. The game system of claim 2, wherein providing the game further comprises updating the trade termination time based on time when the first trade condition updating request is received.

6. The game system of claim 4, wherein providing the game further comprises updating the trade termination time based on time when the second trade condition updating request is received.

7. A non-transitory computer-readable storage medium storing a program for causing a computer to provide a game on terminal devices of players, wherein providing the game comprises:

storing a game program for implementing the game on the terminal devices;

storing owned quantities of first game content and second game content owned by each of a plurality of players of the game, in association with player identification information unique to each of the plurality of players;

storing: first trade condition information including a trade quantity of the first game content set by a first player among the plurality of players, and player identification information of the first player; and second trade condition information including a trade quantity of the second game content set by a second player among the plurality of players, and player identification information of the second player, in association with each other;

generating trade rate information including the trade quantity of the first game content and the trade quantity of the stored second game content;

presenting the trade rate information in the game being played by a third player among the plurality of players;

receiving a first trade condition updating request including at least one of a trade quantity of the first game content and a trade quantity of the second game content set by the third player;

updating the first trade condition information so as to include the trade quantity and the player identification information of the third player included in the first trade condition updating request when the first trade condition updating request includes the trade quantity of the first game content and the trade quantity of the first game content is greater than the trade quantity included in the first trade condition information, and updating the second trade condition information so as to include the trade quantity and the player identification information of the third player included in the first trade condition updating request when the first trade condition updating request includes the trade quantity of the second game content and the trade quantity of the second game content is greater than the trade quantity included in the second trade condition information; and updating the owned quantities of the stored first game content and the second game content, based on the stored first trade condition information and the second trade condition information.

\* \* \* \* \*